US012588597B2

(12) United States Patent
Buss

(10) Patent No.: US 12,588,597 B2
(45) Date of Patent: Mar. 31, 2026

(54) SUGARCANE HARVESTER MACHINE DATA BASED SUGAR PREDICTION AND MAPPING

(71) Applicant: Deere & Company, Moline, IL (US)

(72) Inventor: Jason C. Buss, Thibodaux, LA (US)

(73) Assignee: Deere & Company, Moline, IL (US)

( * ) Notice: Subject to any disclaimer, the term of this patent is extended or adjusted under 35 U.S.C. 154(b) by 253 days.

(21) Appl. No.: 18/522,780

(22) Filed: Nov. 29, 2023

(65) Prior Publication Data

US 2025/0169399 A1     May 29, 2025

(51) Int. Cl.
*A01D 45/10*          (2006.01)

(52) U.S. Cl.
CPC .................................... *A01D 45/10* (2013.01)

(58) Field of Classification Search
CPC .............................. A01D 45/10; A01D 43/085
See application file for complete search history.

(56) References Cited

U.S. PATENT DOCUMENTS

| | | | | |
|---|---|---|---|---|
| 6,272,819 B1 * | 8/2001 | Wendte | .............. | A01D 41/1274 |
| | | | | 56/11.9 |
| 6,584,424 B2 * | 6/2003 | Hardt | ................. | A01D 41/1277 |
| | | | | 460/1 |
| 2014/0208870 A1 * | 7/2014 | Quaderer | ............... | A01D 45/10 |
| | | | | 73/861.73 |
| 2015/0124054 A1 * | 5/2015 | Darr | .................... | G01F 25/0084 |
| | | | | 348/46 |
| 2017/0161560 A1 * | 6/2017 | Itzhaky | .................... | G06N 3/08 |
| 2019/0053427 A1 * | 2/2019 | Matway | ............. | A01D 41/1271 |

* cited by examiner

*Primary Examiner* — Adam R Mott
*Assistant Examiner* — Abigail Lee Espinoza

(57)          ABSTRACT

A sugarcane harvester includes a sensor suite configured for sensing data related to one of a crop yield, a wagon trash content, and a crop pour rate. A computing device is operable to determine a crop yield at a first time during a first time period, determine a wagon trash content at the first time, and determine a crop pour rate at the first time. The computing device may then estimate a delivered sugar weight per unit area during the first time period using an equation stored in the memory of the computing device. The inputs into the equation include the crop yield at the first time, the wagon trash content at the first time and the pour rate at the first time. The result or output of the equation is the estimated delivered sugar weight per unit area during the first time period.

19 Claims, 3 Drawing Sheets

SUGARCANE HARVESTER MACHINE DATA BASED SUGAR PREDICTION AND MAPPING

TECHNICAL FIELD

The disclosure generally relates to a sugarcane harvester, and a computer readable medium for the sugarcane harvester.

BACKGROUND

A sugarcane harvester may include a basecutter, a chopper, an extractor, and an elevator. The basecutter severs stalks of standing sugarcane, thereby separating the stalks of sugarcane from the ground surface. A feed section moves the severed stalks from the basecutter rearward toward the chopper. The chopper cuts or chops the sugarcane stalks into segments called "billets", and discharges the billets toward the elevator. The extractor is positioned between the chopper and the elevator. The extractor includes a fan that induces a flow of air through the billets moving between the chopper and the elevator to extract leaf material from the billets so as to clean the billets. The elevator lifts the billets to a higher elevation for discharge into a wagon for transport to a mill.

The mill receives many wagons full of billets and extracts the sugar from the billets. The amount of sugar extracted by the mill from each wagon load may vary, and may be effected by one or more operating parameters or settings of the sugarcane harvester at the time of harvest. The mill may test small samples of the material delivered on some of the multiple wagons to determine an actual delivered sugar weight or content for a given harvest operation. While the mill may notify the operators of the sugarcane harvester of the actual delivered sugar weight or content for that harvest operation, it is often many hours after the harvest or the next day. As such, the operators of the sugarcane harvester may not receive the data related to the delivered sugar weight or content from the mill in sufficient time to make adjustments to the operating parameters of the sugarcane harvester during the harvest.

SUMMARY

A sugarcane harvester is provided. The sugarcane harvester includes a frame moveably supporting a traction element and configured for movement across a field. A basecutter is supported by the frame and is configured for severing sugarcane stalks near a ground surface. A chopper is supported by the frame and is configured for cutting the sugarcane stalks into billets. An extractor is supported by the frame and is configured for removing leaf material from the billets discharged from the chopper. An elevator is supported by the frame and is configured for receiving the billets from the chopper and lifting the billets to a discharge elevation, whereby the billets may be loaded into a wagon. A sensor suite is supported by the frame. The sensor suite is configured for sensing data from at least one of the basecutter, the chopper, the extractor or the elevator. The sensed data may be related to one of a crop yield, a wagon trash content, and a crop pour rate. A computing device includes a processor and a memory having a sugar prediction algorithm stored thereon. The processor is operable to execute the sugar prediction algorithm to receive data from the sensor suite at a first time during a first time period of a harvest operation. The computing device may then determine a crop yield at the first time from the data sensed at the first time during the first time period by the sensor suite, determine a wagon trash content at the first time from the data sensed at the first time during the first time period by the sensor suite, and determine a crop pour rate at the first time from the data sensed at the first time during the first time period by the sensor suite. The computing device may then estimate a delivered sugar weight per unit area during the first time period using an equation stored in the memory of the computing device. The inputs into the equation include the crop yield at the first time, the wagon trash content at the first time and the pour rate at the first time. The result or output of the equation is the delivered sugar weight per unit area during the first time period.

In one aspect of the disclosure, the sensor suite may further be configured for sensing data from at least one of the basecutter, the chopper, the extractor or the elevator related to one of a ground speed of the frame, a fan speed of the extractor, a sugar loss through the extractor, or a fuel consumption of the sugarcane harvester. The inputs into the equation may include at least one of the ground speed of the frame, the fan speed of the extractor, the sugar loss through the extractor, or the fuel consumption of the sugarcane harvester. In one example implementation, the inputs into the equation include all of the ground speed of the frame, the fan speed of the extractor, the sugar loss through the extractor, or the fuel consumption of the sugarcane harvester.

In one aspect of the disclosure, the equation may include one of a linear equation or a non-linear equation. The equation may include, but is not limited to, a three variable equation, wherein each of the crop yield at the first time, the wagon trash content at the first time and the pour rate at the first time defines one of the three variables of the equation. In other implementations, the equation may include more than three variables, with each of the additional variables of the equation defined by a respective one of the ground speed of the frame, the fan speed of the extractor, the sugar loss through the extractor, or the fuel consumption of the sugarcane harvester.

In one aspect of the disclosure, the processor may be operable to execute the sugar prediction algorithm to determine a harvest area during the first time period. The computing device may determine the harvest area, for example, by determining a ground speed of the sugarcane harvester and a row spacing of the sugarcane stalks. The computing device may then multiply the ground speed, the row spacing, and the first time period to determine the harvest area during the first time period.

In one aspect of the disclosure, the processor may be operable to execute the sugar prediction algorithm to calculate an estimated total delivered sugar weight during the first time period. The computing device may calculate the estimated total delivered sugar weight during the first time period based on the estimated delivered sugar weight per unit area during the first time period and the determined harvest area during the first time period.

In one aspect of the disclosure, the sugarcane harvester may further include a location sensor. The location sensor is supported by the frame and is configured for sensing data related to a geographic location of the frame. The processor may be operable to execute the sugar prediction algorithm to receive data from the location sensor related to the geographic location of the frame at the first time during the first time period of the harvest operation, and determine a location of the harvest area during the first time period from the data received from the location sensor.

In one aspect of the disclosure, the processor may be operable to execute the sugar prediction algorithm to generate a map relating the delivered sugar weight per unit area at the first time during the first time period and the location of the harvest area during the first time period. The map may be in the form of, but is not limited to, a two dimensional geographic map, or a coordinate table defining map coordinates of the harvest area and the delivered sugar weight per unit area associated with the harvest area.

In one aspect of the disclosure, the first time period may be between the range of one tenth of a second (0.1 sec) and ten seconds (10 sec). In one example implementation, the first time period may be defined to equal one second (1 sec). The process described above may be repeated for subsequent time periods, e.g., a second time period, a third time period, . . . n time period. As such, the duration of the time periods may define the time cycle of the process described herein. For example, the delivered sugar weight per unit area for each respective time period, e.g., every second, may be estimated throughout the harvest operation, and summed together to calculate to total delivered sugar weight per unit area throughout the harvest operation.

In one aspect of the disclosure, the processor may be operable to execute the sugar prediction algorithm to control an operating parameter of one of the traction element, the basecutter, the chopper, the extractor or the elevator based on the estimated delivered sugar weight per unit area. For example, the computing device may control the traction element to adjust a ground speed of the frame, control the extractor to adjust a fan speed of the extractor, control a deflector to adjust a trajectory of the billets discharged from the chopper, and/or control a topper of the sugarcane harvester to adjust a cut height of the topper relative to the ground surface.

A non-transitory computer-readable medium is also provided. The non-transitory computer-readable medium includes an equation stored thereon. The equation is configured to receive as inputs into the equation a crop yield, a wagon trash content and a pour rate. The equation is configured to generate as an output a delivered sugar weight per unit area. The non-transitory computer-readable medium further includes instructions stored thereon that when executed by one or more processors cause the one or more processors to perform operations including receiving data from a sensor suite mounted on a sugarcane harvester at a first time during a first time period of a harvest operation. The instructions, when executed, may further cause the one or more processors to perform the following operations: determining a crop yield at the first time from the data sensed at the first time during the first time period by the sensor suite, determining a wagon trash content at the first time from the data sensed at the first time during the first time period by the sensor suite, and determining a crop pour rate at the first time from the data sensed at the first time during the first time period by the sensor suite. The instructions, when executed, may further cause the one or more processors to estimate the delivered sugar weight per unit area during the first time period using the equation.

In one aspect of the disclosure, the instructions may include controlling an operating parameter of one of a traction element of the sugarcane harvester, a basecutter of the sugarcane harvester, a chopper of the sugarcane harvester, an extractor of the sugarcane harvester or an elevator of the sugarcane harvester. The operating parameter is controlled based on the estimated delivered sugar weight per unit area.

In one aspect of the disclosure, the instructions may include determining a harvest area during the first time period. The instructions may further include generating a map relating the delivered sugar weight per unit area at the first time during the first time period and a location of the harvest area. In one aspect of the disclosure, the instructions may further include calculating an estimated total delivered sugar weight during the first time period based on the estimated delivered sugar weight per unit area during the first time period and the harvest area during the first time period.

In one aspect of the disclosure, the equation stored on the non-volatile computer-readable medium may be further configured to receive as inputs into the equation a ground speed of the sugarcane harvester, a fan speed of an extractor of the sugarcane harvester, a sugar loss through the extractor, or a fuel consumption of the sugarcane harvester.

Accordingly, the sugarcane harvester described herein is operable to provide an estimate of the delivered sugar weight for the first time period. The process may be repeated cyclically throughout a harvest operation to obtain an ongoing estimate of the delivered sugar weight throughout the harvest operation. This information enables the operators to control one or more operating parameters of the sugarcane harvester to improve harvest efficiency, i.e., to increase the delivered sugar weight obtained through the harvest. In other aspects of the disclosure, the sugarcane harvester may be operable to automatically control the operating parameters based on the estimated delivered sugar weight. In yet other aspects of the disclosure, the sugarcane harvester may be operable to generate a map to provide additional data relating the estimated delivered sugar weight and the location in the field associated therewith. This additional data may further assist the operator in controlling the sugarcane harvester and/or provide important information for future crop operations, e.g., fertilizing, replanting, etc.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
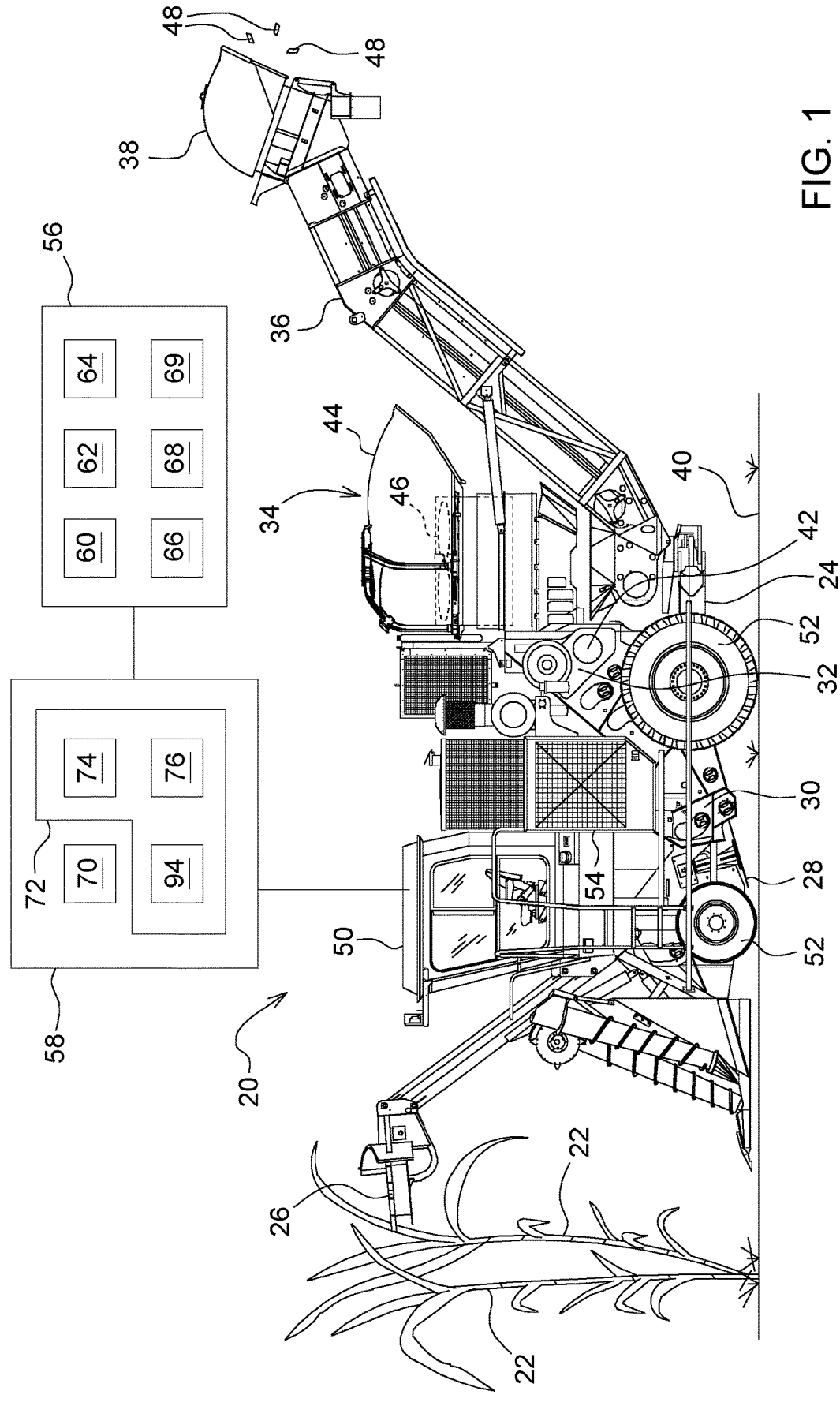
FIG. 1 is a schematic side view of a sugarcane harvester.

Referring to the Figures, wherein like numerals indicate like parts throughout the several views, a sugarcane harvester is generally shown at 20 in FIG. 1. Referring to FIG. 1, the sugarcane harvester 20 is configured to harvest sugarcane stalks 22 while traversing through a field. The sugarcane harvester 20 includes a frame 24 supporting various components and features thereof. The example implementation of the sugarcane harvester 20 shown in the Figures and described herein includes, but is not limited to, a topper 26, a basecutter 28, a feed section 30, a chopper 32, a primary extractor 34, an elevator 36, and a secondary extractor 38, all of which are attached to and/or supported by the frame 24. It should be appreciated that the sugarcane harvester 20 may differ from the example implementation shown in the Figures and described herein.

The topper 26 cuts leaf material off the top of the sugarcane stalks 22 before the stalks 22 are severed by the basecutter 28. However, the topper 26 may not remove all the leaf material from the stalks 22 before ingestion into the sugarcane harvester 20. The leaf material and other non-sugar containing material ingested with the stalks 22 of the sugarcane may be referred to as trash.

The basecutter 28 may include a left cutting disk and a right cutting disk. The left and right cutting disks of the basecutter 28 cooperate with one another to sever the stalks 22 of sugarcane plants at a location near a ground surface 40. The basecutter 28 feeds a mat of the severed sugarcane stalks 22 rearward to the feed section 30. The feed section 30 receives the mat of severed sugarcane stalks 22 from the basecutter 28 and moves the mat rearwardly to the chopper 32. The chopper 32 receives the mat of sugarcane stalks 22 from the feed section 30. The chopper 32 may include a drum 42 configured for cutting the stalks 22 of sugarcane into billets 48. The chopper 32 discharges the billets 48 of sugarcane rearwardly, through the air, toward the elevator 36.

The primary extractor 34 is positioned between the chopper 32 and the elevator 36. As noted above, some leaf material may remain with the sugarcane stalks 22 as the stalks 22 are processed into billets 48. The primary extractor 34 extracts the leaf material discharged from the chopper 32 with the billets 48 and removes the leaf material from the sugarcane harvester 20. The extractor includes a housing 44 defining an interior passage extending along a central axis. The extractor further includes a fan assembly 46 disposed and/or positioned within the interior passage of the housing 44. The fan assembly 46 includes one or more fan blades mounted for rotation about the central axis. Rotation of the fan blades about the central axis induces a flow of air through the interior passage of the housing 44 of the fan assembly 46. The flow of air through the fan assembly 46 extracts the leaf material from the flow of billets 48 moving through the air between the chopper 32 and the elevator 36. The billets 48 are airborne when discharged from the chopper 32, facilitating separation of the leaf material from the billets 48 by the flow of air induced by the fan assembly 46.

The elevator 36 is supported by the frame 24 and positioned at the rear of the sugarcane harvester 20 to receive the billets 48 from the chopper 32. The elevator 36 lifts and/or raises the billets 48 to an elevated position, i.e., a discharge elevation, where the billets 48 are discharged from the sugarcane harvester 20 into a wagon or other conveyance to be hauled away to a mill for processing.

The secondary extractor 38 may be mounted to the upper discharge end of the elevator 36 to further extract leaf material from the billets 48 that may not have been removed by the primary extractor 34. Similar to the primary extractor 34, the billets 48 are airborne when discharged from the elevator 36 at the secondary extractor 38 facilitating separation of leaf material from the billets 48 by a flow of air induced by a fan assembly 46 of the secondary extractor 38.

The sugarcane harvester 20 includes an operator's station 50 and traction elements 52 attached to and/or supported by the frame 24. A human operator can operate the sugarcane harvester 20 from the operator's station 50. The traction elements 52 are positioned on the left and right sides of the sugarcane harvester 20 for engaging the ground surface 40 and propelling the sugarcane harvester 20 along the ground surface 40 for movement across the field. Illustratively, there may be two traction elements 52 located on each side of the sugarcane harvester 20, each in the form of a ground-engaging wheel. In other embodiments, there may be one traction element 52 located on each side of the sugarcane harvester 20, in the form of a track unit. The traction elements 52 and other components of the sugarcane harvester 20 may be powered by a prime mover 54. The prime mover 54 may include, but is not limited to, an internal combustion engine, an electric powertrain, or a combination of each. A geartrain may connect the prime mover 54 and the traction elements 52. In other implementations, the prime mover 54 may power one or more hydraulic motors, which are in turn coupled to the tractions elements to generate propulsion.

The sugarcane harvester 20 further includes a sensor suite 56. The sensor suite 56 is supported by and moveable with the frame 24. The sensor suite 56 is configured for sensing data from at least one of the basecutter 28, the chopper 32, the extractor, the elevator 36, a prime mover 54 of the sugarcane harvester 20, (e.g., an internal combustion engine), hydraulic pressure, the traction element 52, the topper 26, or some other feature or component of the sugarcane harvester 20 not described herein.

The sensor suite 56 may include one or more sensors coupled to a computing device 58, with each sensor configured for sensing a different type of data related to one or more operating parameters and/or conditions of the sugarcane harvester 20. Each of the individual sensors of the sensor suite 56 may be supported by and moveable with the frame 24 of the sugarcane harvester 20, i.e., an on-board sensor. The different types of data sensed by the sensor suite 56 may be related to one of, but is not limited to, a crop yield 78, a wagon trash content 80, a crop pour rate 82, a ground speed 84 of the sugarcane harvester 20, a fan speed 86 of the extractor, a sugar loss 88 through the extractor, a fuel consumption 90 of the sugarcane harvester 20, or a geographic location of the sugarcane harvester 20.

As noted above, the sensor suite 56 may include multiple sensors, with each respective sensor configured for sensing a different type of data. For example, the sensor suite 56 may include, but is not limited to, one or more mass flow sensors 60, one or more constituent sensors 62, one or more rotational speed sensors 64, one or more weight and/or force sensors 68, one or more position sensors 69, a ground speed sensor, a location sensor 66, etc. The one or more sensors may be used individually or in combination to calculate and/or determine the different parameters described below.

In one implementation, the sensor suite 56 may include the mass flow sensor 60 (or combination of sensors) configured for sensing data related to a mass flow rate of crop material moving through the sugarcane harvester 20. It should be appreciated that the sensor suite 56 may include multiple mass flow sensors 60 positioned at different locations throughout the sugarcane harvester 20 for sensing data related to a mass flow rate through different components of the sugarcane harvester 20. For example, the mass flow sensor 60 may be positioned for detecting data related to a mass flow rate through the basecutter 28, the chopper 32, the extractor, and/or the elevator 36. The mass flow sensor 60 may include any sensor capable of sensing data related to and/or used by the computing device 58 to calculate and/or determine the mass flow rate of the crop material moving past the sensor. For example, the mass flow sensor 60 may include, but is not limited to, an optical sensor or camera configured for capturing an image and/or video of the crop material moving past a component of the sugarcane harvester 20, a force sensor 68 configured for sensing data related to a weight of the crop material moving past a component of the sugarcane harvester 20, a Near InfraRed (NIR) sensor configured for capturing images/video in the near infra red light spectrum, etc. It should be appreciated that the computing device 58 may determine/calculate the mass flow rate from many different types of data from many different types of sensors using different techniques. The mass flow rate may be used by the computing device 58 to calculate and/or determine harvest characteristics, such as but not limited to, a crop yield 78 (defined herein as a mass or weight per unit area of harvested sugarcane loaded into wagon), wagon trash (defined herein as a mass or weight per unit area of trash (i.e., non-billet material) loaded into wagon), pour rate 82 (defined herein as a weight or mass per unit time of crop material moving through the sugarcane harvester 20), etc. In one example, the weight and/or mass of the harvested material may be determined using artificial intelligence trained to identify the billets 48 and/or trash included in images captured of the harvested material on the elevator 36. This data may be compared to the harvest area to calculate the crop yield 78 and/or wagon trash, or may be compared to a time parameter to calculate the pour rate 82. It should be appreciated that the harvest characteristics described herein, and other harvest characteristics not described herein, may be calculated and/or determined by the computing device 58 in some other manner and using other types of data than the example implementations described herein.

In one implementation, the sensor suite 56 may further include the constituent sensor 62. The constituent sensor 62 (which may include a combination of sensors) is configured for sensing data related to properties of the crop material. The properties of the crop material may include for example, but are not limited to, a sugar content and/or a moisture content. It should be appreciated that the sensor suite 56 may include multiple constituent sensors 62 positioned at different locations throughout the sugarcane harvester 20 for sensing data related to properties of the crop material. For example, the constituent sensor 62 may be positioned for detecting data related to a sugar content of the crop material moving through the extractor and/or the elevator 36. The constituent sensor 62 may include any sensor capable of sensing data related to and/or used by the computing device 58 to calculate and/or determine the properties of the crop material, e.g., the sugar content and/or the moisture content. For example, the constituent sensor 62 may include, but is not limited to, a Near InfraRed (NIR) sensor configured for capturing images/video in the near infra red light spectrum, etc. It should be appreciated that the computing device 58 may determine/calculate the properties of the crop material from different types of data from many different types of sensors. The properties of the crop material may be used by the computing device 58 to calculate and/or determine harvest characteristics, such as but not limited to, an extractor loss (defined herein as a sugar content of the trash material removed by the primary extractor 34 and/or the secondary extractor 38).

In other implementations, the extractor loss may be estimated based on a determination of billet loss through the primary extractor 34. For example, the primary extractor 34 may be equipped with a force sensor 68 operable to detect forces applied thereto. The force sensor 68 and/or the computing device 58 may be configured to detect and/or determine billet loss through the primary extractor 34 based on detected impacts and/or pressure applied by the trash material against the walls of the housing 44 of the primary extractor 34. The computing device 58 may use the force data detecting impacts against the walls of the housing 44 of the primary extractor 34 to interpolate or estimate the quantity, number, volume, and/or mass of the billets 48 passing through the extractor, and thereby determine and/or estimate the extractor loss, i.e., the sugar content of the material removed by the primary extractor 34. It should be appreciated that the extractor loss may be calculated using other types of data in processes other than the example processes described herein.

In one implementation, the sensor suite 56 may further include one or more rotational speed sensors 64. The rotational speed sensor 64 may be configured for sensing data related to a rotational speed and/or position of one or more rotating components of the sugarcane harvester 20. It should be appreciated that the sensor suite 56 may include multiple rotational speed sensors 64 positioned at different locations throughout the sugarcane harvester 20 for different rotating components. For example, the sugarcane harvester 20 may include a rotational speed sensor 64 positioned for sensing a rotational speed of the fan of the extractor, a rotational speed sensor 64 positioned for sensing a rotational speed of the drum 42 of the chopper 32, a rotational speed sensor 64 positioned for sensing a rotational speed of the basecutter 28, a rotational speed sensor 64 positioned for sensing a rotational speed of a rotating component of the feed section 30, etc. The rotational speed sensor 64 may include any sensor capable of sensing data related to and/or used by the computing device 58 to calculate and/or determine a rotational speed of a respective rotating component. For example, the rotational speed sensor 64 may include, but is not limited to, a hall effect sensor, a rotary potentiometer, an optical or magnetic encoder, a magneto resistive sensor, etc. It should be appreciated that the computing device 58 may determine/calculate the rotational speed of the respective rotating components from different types of data from many different types of sensors. The rotational speed of the various rotating components of the sugarcane harvester 20 may be used by the computing device 58 to calculate and/or determine harvest characteristics, such as but not limited to, a rotating speed of the fan of the extractor, a ground speed 84 of the sugarcane harvester 20, the pour rate 82, the yield, a fuel rate (defined herein as the fuel consumption 90 of the sugarcane harvester 20), etc.

In one implementation, the sensor suite 56 may further include one or more force sensors 68. It should be appreciated that the force sensor 68 may alternatively be referred to as a weight sensor. The force sensor 68 (which may include a combination of sensors) may be configured for sensing data related to a force applied to a component of the sugarcane harvester 20. It should be appreciated that the sensor suite 56 may include multiple force sensors 68 positioned at different locations throughout the sugarcane harvester 20 for sensing force data related to different components. For example, the sugarcane harvester 20 may include a force sensor 68 positioned for sensing a force, e.g., a weight, applied to the elevator 36, a force applied to a wall of the extractor, a force applied to a deflector, etc. The force sensor 68 may include any sensor capable of sensing data related to and/or used by the computing device 58 to calculate and/or determine force applied to a component. For example, the force sensor 68 may include, but is not limited to, a load cell, a strain gauge, a force sensing resistor, a tensile force sensor 68, a compression force sensor 68, a piezoelectric sensor, etc. It should be appreciated that the computing device 58 may determine/calculate the force applied to a respective component from different types of data from many different types of sensors. Forces applied to the various components of the sugarcane harvester 20 may be used by the computing device 58 to calculate and/or determine harvest characteristics, such as but not limited to, the extractor loss, the yield, the wagon trash, the pour rate 82, etc.

In one implementation, the sensor suite 56 may further include one or more position sensors 69. The position sensor 69 (which may include a combination of sensors) may be configured for sensing data related to a position of a component of the sugarcane harvester 20. It should be appreciated that the sensor suite 56 may include multiple position sensors 69 disposed at different locations throughout the sugarcane harvester 20 for sensing position data related to different components. For example, the sugarcane harvester 20 may include a position sensor 69 positioned to sense data related to a position of the drum 42 of the chopper 32, a position sensor 69 positioned to sense data related to a position of the basecutter 28 relative to the frame 24, a position sensor 69 positioned to sense data related to a position of the topper 26 relative to the frame 24, a position sensor 69 positioned to sense data related to a position of a deflector of the extractor, etc. The position sensor 69 may include any sensor capable of sensing data related to and/or used by the computing device 58 to calculate and/or determine force relative position of a component. For example, the position sensor 69 may include, but is not limited to, a linear potentiometer, a rotary potentiometer, a hall effect sensor, an eddy-current sensor, an inductive sensor, a capacitive sensor, etc. It should be appreciated that the computing device 58 may determine/calculate the position of a respective component from different types of data from many different types of sensors. A position of a component of the sugarcane harvester 20 may be used by the computing device 58 to calculate and/or determine harvest characteristics, such as but not limited to, the ground speed 84 of the sugarcane harvester 20, a throttle setting of the sugarcane harvester 20, etc. Additionally, the position of relative components may be used by the computing device 58 to control different operating parameters of the sugarcane harvester 20, such as but not limited to a height of the topper 26, a height of the basecutter 28, a position of the deflector of the extractor, a position of the elevator 36, etc.

In one implementation, the sensor suite 56 may further include the location sensor 66. The location sensor 66 may be configured for sensing data related to a geographic location of the sugarcane harvester 20. The location sensor 66 may include any sensor capable of sensing data related to and/or used by the computing device 58 to calculate and/or determine a geographic location of the sugarcane harvester 20. For example, the location sensor 66 may include, but is not limited to, Global Positioning Satellite (GPS) system as understood by those skilled in the art, a ground speed sensor, an accelerometer, etc. The geographic location of the sugarcane harvester 20 may be used by the computing device 58 to calculate and/or determine harvest characteristics, such as but not limited to, the ground speed 84 of the sugarcane harvester 20. Additionally, the location of the sugarcane harvester 20 may be used by the computing device 58 to map and/or georeferenced other data sensed by the sensor suite 56 and/or calculated by the computing device 58, such as but not limited to, a location of an estimated delivered sugar weight per unit area, a location of yield data, etc.

The computing device 58 is disposed in communication with each of the sensors of the sensor suite 56 for receiving data therefrom. In some implementations, the computing device 58 may additionally be disposed in communication with one or more features/components of the sugarcane harvester 20 for controlling operation thereof. While the computing device 58 is generally described herein as a singular device, it should be appreciated that the computing device 58 may include multiple devices linked together to share and/or communicate information therebetween. Furthermore, it should be appreciated that the computing device 58 may be located on the sugarcane harvester 20 or located remotely from the sugarcane harvester 20.

The computing device 58 may alternatively be referred to as a computer, a controller, a control unit, a control module, a module, etc. The computing device 58 includes a processor 70, a memory 72, and all software, hardware, algorithms, connections, sensors, etc., necessary to implement the process described herein. As such, a method may be embodied as a program or algorithm operable on the computing device 58. It should be appreciated that the computing device 58 may include any device capable of analyzing data from various sensors, comparing data, making decisions, and executing the required tasks.

As used herein, "computing device 58" is intended to be used consistent with how the term is used by a person of skill in the art, and refers to a computing component with processing, memory, and communication capabilities, which is utilized to execute instructions (i.e., stored on the memory 72 or received via the communication capabilities) to control or communicate with one or more other components. In certain embodiments, the computing device 58 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The computing device 58 may be in communication with other components on the sugarcane harvester 20, such as hydraulic components, electrical components, and operator inputs within the operator station. The computing device 58 may be wirelessly connected and/or electrically connected to these other components by a wiring harness such that messages, commands, and electrical power may be transmitted between the computing device 58 and the other components. Although the computing device 58 is referenced in the singular, in alternative embodiments the configuration and functionality described herein can be split across multiple devices using techniques known to a person of ordinary skill in the art.

The computing device 58 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 72 may include any non-transitory/tangible medium which participates in providing data or computer-readable instructions. The memory 72 may be non-volatile or volatile. Non-volatile media may include, for example, optical or magnetic disks and other persistent memory. Example volatile media may include dynamic random access memory (DRAM), which may constitute a main memory. Other examples of embodiments for memory 72 include a floppy, flexible disk, or hard disk, magnetic tape or other magnetic medium, a CD-ROM, DVD, and/or any other optical medium, as well as other possible memory devices such as flash memory.

The computing device 58 includes the tangible, non-transitory computer-readable memory 72 on which are recorded computer-executable instructions, including a sugar prediction algorithm 74. The processor 70 of the computing device 58 is configured for executing the sugar prediction algorithm 74. The sugar prediction algorithm 74 implements a method of estimating a delivered sugar weight during a harvest, described in detail below.

Figure 2:
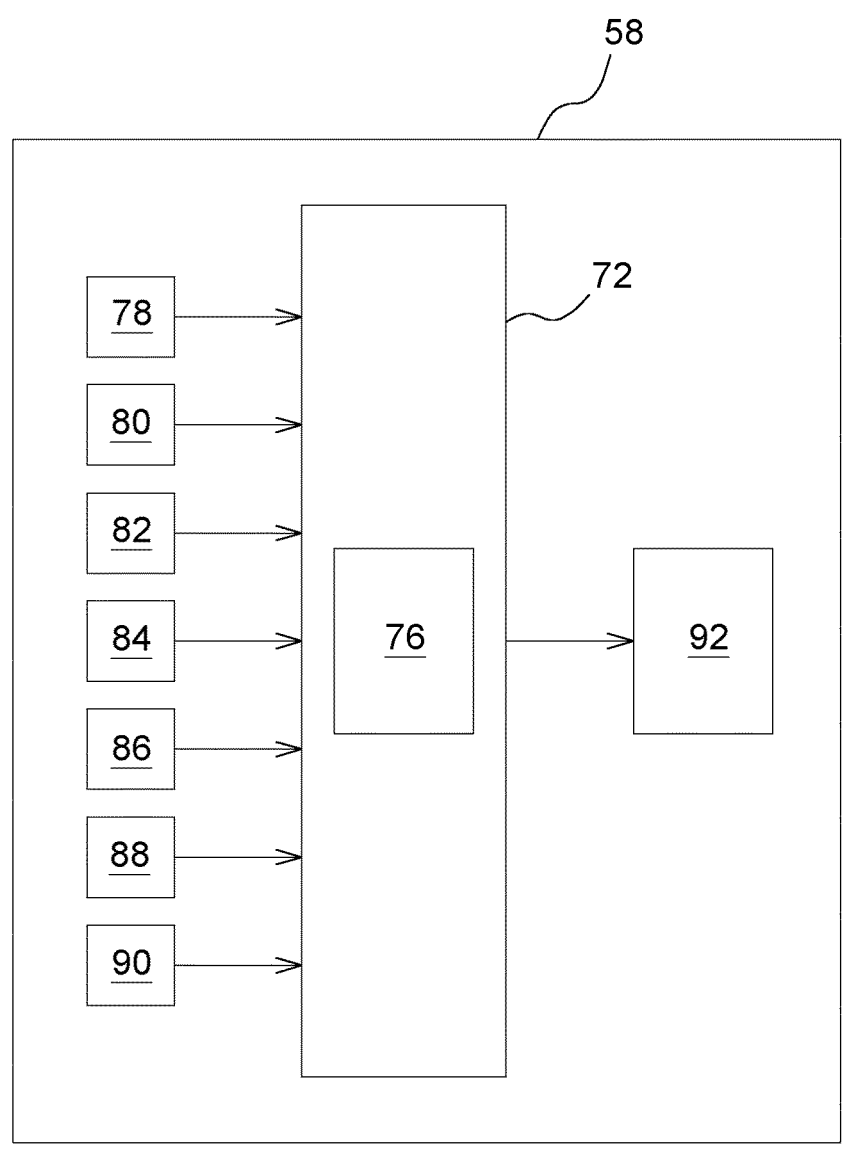
FIG. 2 is a schematic flow chart representing inputs into an equation and a resultant output.

Referring to FIG. 2, the non-transitory computer-readable memory 72 includes an equation 76 stored thereon. The equation 76 is configured to receive as inputs into the equation 76 at least a crop yield 78 at a first time 98, a wagon trash content 80 at the first time 98 and a pour rate 82 at the first time 98. The equation 76 may further receive as inputs one or more of a ground speed 84 of the sugarcane harvester 20 (e.g., the ground speed of the frame 24) at the first time 98, a fan speed 86 of the primary extractor 34 at the first time 98, a sugar loss 88 through the primary extractor 34 at the first time 98, or a fuel consumption 90 of the sugarcane harvester 20 at the first time 98. The equation 76 is configured to generate as an output or result an estimated delivered sugar weight 92 per unit area during a first time period 96. The equation 76 may be configured as one of a linear equation or a non-linear equation as understood by those skilled in the art. The number of inputs into the equation 76, i.e., the number of variables of the equation 76, may include, for example, three inputs, e.g., the crop yield 78, the wagon trash content 80 and the pour rate 82. In other implementations, the number of inputs into the equation 76, i.e., the number of variables of the equation 76, may include a number greater than three. In one implementation, the number of inputs into the equation 76 includes seven variable inputs, e.g., the crop yield 78, the wagon trash content 80 and the pour rate 82, the ground speed 84 of the frame 24, the fan speed 86 of the primary extractor 34, the sugar loss 88 through the primary extractor 34, or the fuel consumption 90 of the sugarcane harvester 20. It should be appreciated that the equation 76 may include any combination of the variables described herein, and/or include other variables not described herein.

Figure 3:
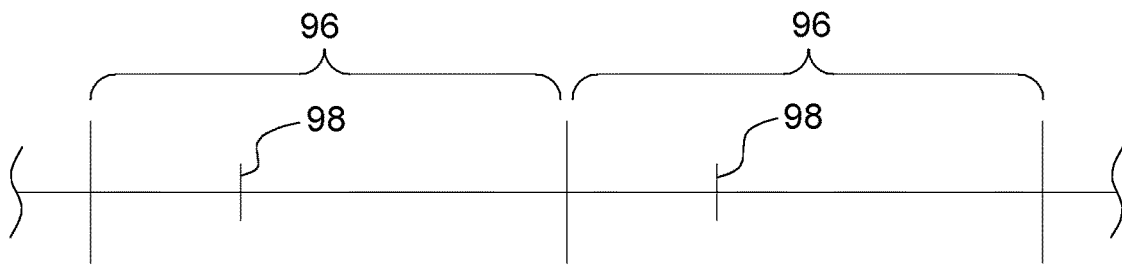
FIG. 3 is a schematic time line.

Referring to FIG. 3, wherein time is generally shown along a horizontal axis, the first time period 96 may be defined to include a duration of time during which the sensor suite 56 senses data. For example, the first time period 96 may be defined to include a duration of time approximately equal to and/or between the range of one tenth of a second (0.1 sec) and ten seconds (10 sec). The process described herein may be repeated in a cyclical fashion throughout a harvest operation, during which the first time period 96 may be defined as the cycle of the process. For example, if the first time period 96 is defined to equal one second, then the process described herein may be repeated once every second, i.e., at a cycle of one hertz (1 Hz). It should be appreciated that the first time period 96 and the cycle may vary from the example implementation described above. The first time 98 of the first time period 96 may be defined to include a point in time during the first time period 96 at which the data is sensed by the sensor suite 56. The first time 98 may occur at any point in time during the first time period 96.

The process described herein begins with the sugarcane harvester 20 beginning a harvest operation in which the sugarcane harvester 20 traverses across a field harvesting sugarcane as described above. As the sugarcane harvester 20 processes the sugarcane, the sensor suite 56 senses data related to one or more component of the sugarcane harvester 20 and/or one or more characteristic of the harvested sugarcane. The computing device 58 receives the data from the sensor suite 56 at the first time 98 during the first time period 96 of the harvest operation.

Figure 4:
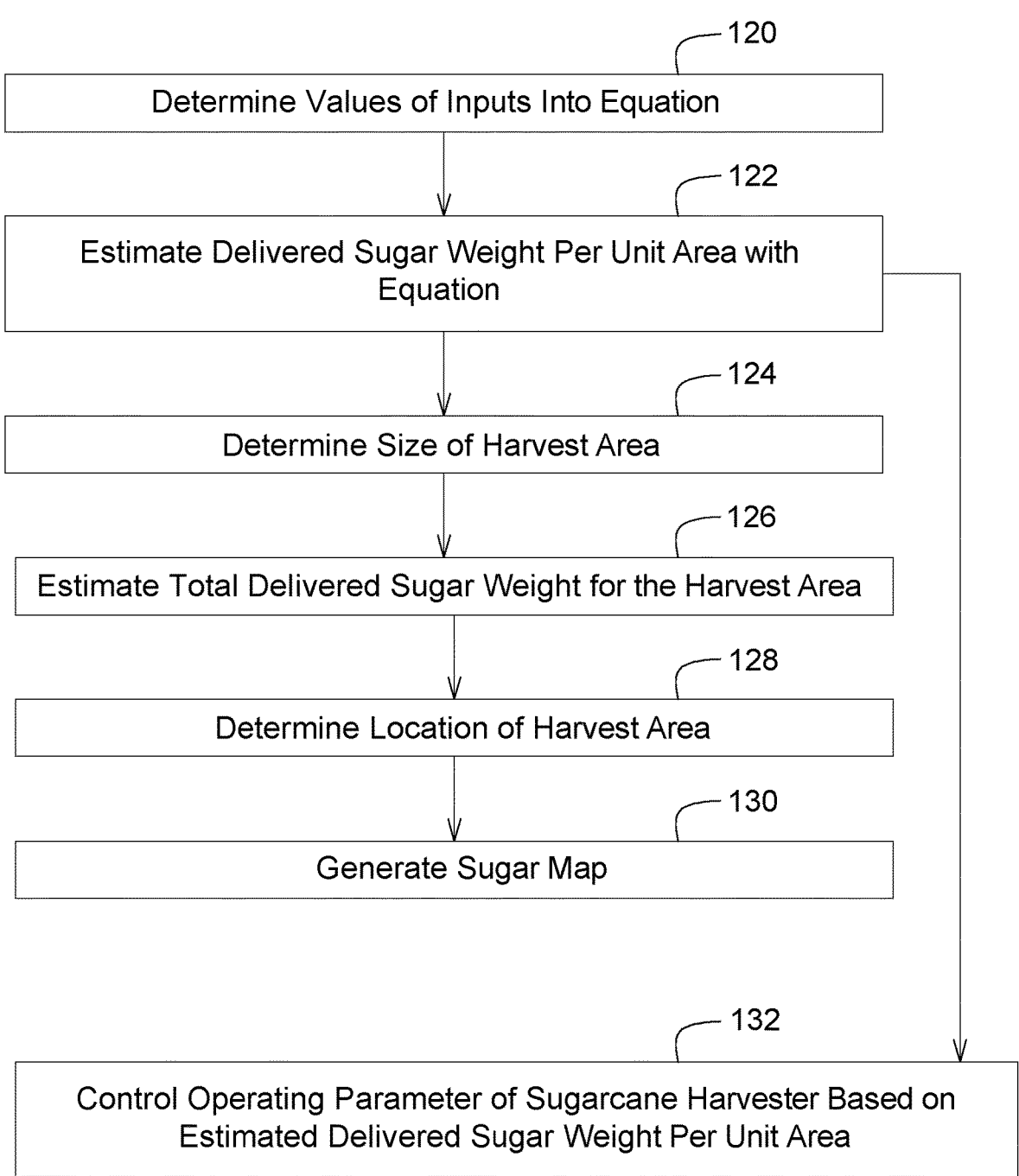
FIG. 4 is a flow chart representing a method of controlling the sugarcane harvester.

The computing device 58 may then determine values for the inputs of the equation 76 at the first time 98. The step of determining the values of the inputs of the equation 76 is generally indicated by box 120 shown in FIG. 4. For example, referring to FIG. 2, the computing device 58 may determine values for the crop yield 78, the wagon trash content 80, and the crop pour rate 82 at the first time 98. In one implementation, the computing device 58 may determine the crop yield 78 at the first time 98 from the data sensed at the first time 98 during the first time period 96 by the sensor suite 56. For example, the computing device 58 may use artificial intelligence image analysis to determine a weight and/or mass of the crop material moving through the sugarcane harvester 20. In one implementation, the sugarcane harvester 20 may include an image sensor positioned to detect images of the crop material on the elevator 36 prior to being discharged by the secondary extractor 38. The computing device 58 may analyze these images, based on machine learned data, to determine the mass and/or weight of the material on the elevator 36. Particularly, the computing device 58 may analyze these images to classify the material on the elevator 36 as either billet or trash, and determine the mass and/or weight of each. The computing device 58 may use this data in association with the area harvested to calculate and/or determine the crop yield 78, i.e., the mass or weight of billets 48 per unit area. It should be appreciated that the value for the crop yield 78 at the first time 98 may be calculated and/or determined in some other manner using other types of data different than the exemplary process described herein. The processes used to calculate and/or determine the crop yield 78, and the types of data used thereby, are understood by those skilled in the art, and are therefore not described in greater detail herein.

The computing device 58 may additionally determine the wagon trash content 80 at the first time 98 from the data sensed at the first time 98 during the first time period 96 by the sensor suite 56. In one implementation, the computing device 58 may determine the wagon trash content 80 at the first time 98 from the data sensed at the first time 98 during the first time period 96 by the sensor suite 56. For example, the computing device 58 may use artificial intelligence image analysis to determine a weight and/or mass of the crop material moving through the sugarcane harvester 20. In one implementation, the sugarcane harvester 20 may include an image sensor positioned to detect images of the crop material on the elevator 36 prior to being discharged by the secondary extractor 38. The computing device 58 may analyze these images, based on machine learned data, to determine the mass and/or weight of the material on the elevator 36. Particularly, the computing device 58 may analyze these images to classify the material on the elevator 36 as either billet or trash, and determine the mass and/or weight of each. The computing device 58 may use this data in association with the area harvested to calculate and/or determine the wagon trash content 80, i.e., the mass or weight of trash per unit area. It should be appreciated that the value for the wagon trash content 80 at the first time 98 may be calculated and/or determined in some other manner using other types of data different than the exemplary process described herein. The processes used to calculate and/or determine the wagon trash content 80, and the types of data used thereby, are understood by those skilled in the art, and are therefore not described in greater detail herein.

The computing device 58 may additionally determine the crop pour rate 82 at the first time 98 from the data sensed at the first time 98 during the first time period 96 by the sensor suite 56. In one implementation, the computing device 58 may determine the crop pour rate 82 at the first time 98 from the data sensed at the first time 98 during the first time period 96 by the sensor suite 56. For example, the computing device 58 may use artificial intelligence image analysis to determine a weight and/or mass of the crop material moving through the sugarcane harvester 20. In one implementation, the sugarcane harvester 20 may include an image sensor positioned to detect images of the crop material on the elevator 36 prior to being discharged by the secondary extractor 38. The computing device 58 may analyze these images, based on machine learned data, to determine the mass and/or weight of the material on the elevator 36. The computing device 58 may use this data in association with the time data associated with the first time period 96 to calculate and/or determine the crop pour rate 82, i.e., the mass or weight of crop material per unit time. It should be appreciated that the value for the crop pour rate 82 at the first time 98 may be calculated and/or determined in some other manner using other types of data different than the exemplary process described herein. The processes used to calculate and/or determine the crop pour rate 82, and the types of data used thereby, are understood by those skilled in the art, and are therefore not described in greater detail herein.

The computing device 58 may additionally determine the ground speed 84 of the sugarcane harvester 20 at the first time 98 from the data sensed at the first time 98 during the first time period 96 by the sensor suite 56. In one implementation, the computing device 58 may determine the ground speed 84 using a Global Positioning Satellite (GPS) system as is understood by those skilled in the art. In other implementations, the sugarcane harvester 20 may be equipped with a rotational speed sensor 64 coupled to the traction element 52 and operable to detect data related to a rotational speed. The computing device 58 may then calculate the ground speed 84 from this data. The processes used to calculate and/or determine the ground speed 84, and the types of data used thereby, are understood by those skilled in the art, and are therefore not described in greater detail herein.

The computing device 58 may additionally determine the fan speed 86 of the extractor at the first time 98 from the data sensed at the first time 98 during the first time period 96 by the sensor suite 56. In one implementation, the computing device 58 may determine the fan speed 86 of the extractor, e.g., the primary extractor 34, with a rotational speed sensor 64 positioned to detect the rotational movement of the motor driving the fan, as is understood by those skilled in the art. The sensors and processes used to calculate and/or determine the fan speed 86 of the extractor, and the types of data used thereby, are understood by those skilled in the art, and are therefore not described in greater detail herein.

The computing device 58 may additionally determine the sugar loss 88 through the extractor at the first time 98 from the data sensed at the first time 98 during the first time period 96 by the sensor suite 56. In one implementation, the computing device 58 may calculate the sugar loss 88 through the extractor by estimating the number and/or weight of billets 48 moving through the extractor. As described above, the sugarcane harvester 20 may include a force sensor 68 positioned to detect forces applied to the walls of the extractor. The computing device 58 may use this data to determine a mass/volume of trash moving through the extractor. Additionally, the computing device 58 may identify impact events from the force data, indicating billets 48 striking the walls of the extractor, and therefrom calculate the quantity and/or mass of billets 48 moving through the extractor. With the estimated quantity and/or mass of billets 48 moving through the extractor, the computing device 58 may calculate the amount of sugar loss 88 through the extractor. It should be appreciated that the sugar loss 88 through the extractor may be determined in other manners, such as but not limited to using a NIR constituent sensor 62, such as described above. The sensors and processes used to calculate and/or determine the sugar loss 88 through the extractor, and the types of data used thereby, are understood by those skilled in the art, and are therefore not described in greater detail herein.

The computing device 58 may additionally determine the fuel consumption 90 of the sugarcane harvester 20 at the first time 98 from the data sensed at the first time 98 during the first time period 96 by the sensor suite 56. In one implementation, the computing device 58 may determine the fuel consumption 90 from an Engine Control Unit (ECU) associated with the prime mover 54. The ECU may determine the fuel consumption 90 based on, for example, a duty cycle of fuel injectors, a throttle position, a fuel rail pressure, etc. The fuel consumption 90 is generally available on the Can bus. The sensors and processes used to calculate and/or determine the fuel consumption 90, and the types of data used thereby, are understood by those skilled in the art, and are therefore not described in greater detail herein.

The computing device 58 may then estimate a delivered sugar weight 92 per unit area during the first time period 96 using the equation 76 stored in the memory 72. The step of estimating the delivered sugar weight 92 per unit area is generally indicated by box 122 shown in FIG. 4. As described above, with reference to FIG. 2, the computing device 58 inputs the values of the variables of the equation 76 calculated and/or determined for the first time 98 during the first time period 96. The output or result of the equation 76 is the estimated delivered sugar weight 92 per unit area during the first time period 96. The estimated delivered sugar weight 92 per unit area may be defined as an estimated value of the weight of sugar that may be extracted by the mill per unit area harvested, e.g., tons/acre. It should be appreciated that the crop yield 78 and/or weight of the crop loaded into the wagons contains material other than sugar, and as such is not equal to the delivered sugar weight. Furthermore, it should be appreciated that the estimated delivered sugar weight 92 per unit area is calculated from the data sensed by the sensor suite 56 on the sugarcane harvester 20 at the time of harvest. The estimated delivered sugar weight 92 per unit area generated by the equation 76 is different from the actual or measured sugar weight calculated by a mill via sampling, extraction, and analysis of the harvested wagon loads of sugarcane. As such, the estimated delivered sugar weight 92 per unit area generated by and/or output from the equation 76 provides the operator with real time data (estimates) of the quantity or weight of the sugar that may be delivered through the harvest operation.

In one implementation of the process described herein, the computing device 58 may be configured to determine a harvest area during the first time period 96. The step of determining the harvest area is generally indicated by box 124 shown in FIG. 4. The harvest area may be defined as the area of the field harvested during the first time period 96. In one implementation, the computing device 58 may calculate the harvest area by multiplying a harvest width of the sugarcane harvester 20, the ground speed 84 of the sugarcane harvester 20, and the duration of the first time period 96. It should be appreciated that the computing device 58 may calculate the harvest area in some other manner using other types of data than that described herein.

The computing device 58 may further be configured to calculate an estimated total delivered sugar weight during the first time period 96. The step of estimating the total delivered sugar weight is generally indicated by box 126 shown in FIG. 4. The estimated total delivered sugar weight during the first time period 96 may be defined as an estimate of the total weight of sugar that may be extracted from the crop material harvested from the harvest area during the first time period 96. The estimated total delivered sugar weight during the first time period 96 may be derived based on the estimated delivered sugar weight 92 per unit area during the first time period 96 and the harvest area during the first time period 96. For example, the computing device 58 may calculate the estimated total delivered sugar weight during the first time period 96 by multiplying the estimated delivered sugar weight 92 per unit area during the first time period 96 by the harvest area during the first time period 96. It should be appreciated that the computing device 58 may calculate the estimated total delivered sugar weight during the first time period 96 in some other manner using other types of data than described herein.

The computing device 58 may further be configured to receive data from the location sensor 66 related to the geographic location of the sugarcane harvester 20, e.g., the frame 24 thereof, at the first time 98 during the first time period 96 of the harvest operation. The computing device 58 may then determine a location of the harvest area during the first time period 96 from the data received from the location sensor 66. The step of determining a location of the harvest area is generally indicated by box 128 shown in FIG. 4. The computing device 58 may determine the location of the harvest area using the data from the location sensor 66, e.g., GPS data, in a manner understood by those skilled in the art. The computing device 58 may define the location of the harvest area in terms of a delineated boundary of the harvest area, or may alternatively define the location of the harvest area based on a centralized point, e.g., a center point, of the harvest area. In particular, the computing device 58 may define the geographic boundary of the harvest area during the first time period 96 and associate the location of the harvest area with the data sensed by the sensor suite 56 during the first time period 96. The computing device 58 may further associate any other calculated and/or determined operating characteristics of the sugarcane harvester 20 and/or the harvested crop material with the geographic location of the harvest area relative to the field.

In one aspect of the disclosure, the computing device 58 may be configured to generate a map, e.g., a sugar map 94. The step of generating the sugar map 94 is generally indicated by box 130 shown in FIG. 4. The sugar map 94 may be arranged to relate the estimated delivered sugar weight 92 per unit area at the first time 98 during the first time period 96 and the location of the harvest area during the first time period 96. For example, the sugar map 94 may be generated to visually show the estimated delivered sugar weight 92 for the harvest area during the first time period 96, e.g., via a color code or other similar visualization technique. It should be appreciated that when the process described above is iteratively repeated over multiple cycles, each cycle will generate a respective harvest area having a respective estimated delivered sugar weight 92 therefore, and that the sugar map 94 may show each harvest area and respective estimated delivered sugar weight 92 for each cyclical period. By doing so, differences between the estimated sugar weight from the different locations and areas throughout the field may become visually apparent.

In one aspect of the disclosure, the computing device 58 may be configured to control one or more operating parameters of the sugarcane harvester 20 based on the estimated delivered sugar weight 92 per unit area. The step of controlling at least one operating parameter of the sugarcane harvester 20 is generally indicated by box 132 shown in FIG. 4. The operating parameter may include one of, but is not limited to the traction element 52, the basecutter 28, the chopper 32, the extractor or the elevator 36. For example, based on the estimated delivered sugar weight 92 per unit area, the computing device 58 may control the traction element 52 to adjust the ground speed 84 of the sugarcane harvester 20. Controlling the ground speed 84 of the sugarcane harvester 20 may affect the pour rate 82 of the crop material moving through the sugarcane harvester 20, which in turn may affect the trash content and/or billet quality (and thereby the amount of sugar) loaded into the wagon.

In another example, based on the estimated delivered sugar weight 92 per unit area, the computing device 58 may control the extractor to adjust a fan speed 86 of the extractor.

Controlling the rotational speed of the fan may affect the quantity of trash removed and/or the sugar loss 88 through the extractor, thereby affecting the amount of sugar per unit weight loaded into the wagon.

In another example, based on the estimated delivered sugar weight 92 per unit area, the computing device 58 may control a deflector of the extractor to adjust a trajectory of the billets 48 discharged from the chopper 32. The position of the deflector may alter the trajectory of the billets 48, thereby affecting the operation of the extractor, which in turn may affect the amount of sugar per unit weight loaded into the wagon.

In another example, based on the estimated delivered sugar weight 92 per unit area, the computing device 58 may control the topper 26 of the sugarcane harvester 20 to adjust a cut height of the topper 26 relative to the ground surface 40. Controlling the topper 26 may adjust the amount of leaf material that is ingested into the machine, thereby affecting the amount of trash, which in turn may affect the amount of sugar per unit weight loaded into the wagon.

It should be appreciated that other features and operations of the sugarcane harvester 20 may be controlled in some other manner not specifically mentioned and/or described herein in a manner that improves the amount of sugar per unit weight loaded into the wagon. By generating the estimated delivered sugar weight 92 per unit area in real time, the operator of the sugarcane harvester 20 may control one or more settings and/or operating parameters to maximize the sugar content of the material loaded into the wagon, thereby improving efficiency of the harvest operation.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A sugarcane harvester comprising:
   a frame moveably supporting a traction element and configured for movement across a field;
   a basecutter supported by the frame and configured for severing sugarcane stalks near a ground surface;
   a chopper supported by the frame and configured for cutting the sugarcane stalks into billets;
   an extractor supported by the frame and configured for removing leaf material from the billets discharged from the chopper;
   an elevator supported by the frame and configured for receiving the billets from the chopper and lifting the billets to a discharge elevation;
   a sensor suite supported by the frame and configured for sensing data from at least one of the basecutter, the chopper, the extractor or the elevator related to a crop yield, a wagon trash content, and a crop pour rate;
   a computing device including a processor and a memory having a sugar prediction algorithm stored thereon, wherein the processor is operable to execute the sugar prediction algorithm to:
      receive data from the sensor suite at a first time during a first time period of a harvest operation;
      determine a crop yield at the first time from the data sensed at the first time during the first time period by the sensor suite;
      determine a wagon trash content at the first time from the data sensed at the first time during the first time period by the sensor suite;

determine a crop pour rate at the first time from the data sensed at the first time during the first time period by the sensor suite; and
      estimate a delivered sugar weight per unit area during the first time period using an equation stored in the memory, wherein the inputs into the equation include the crop yield at the first time, the wagon trash content at the first time and the pour rate at the first time, and wherein the result of the equation is the estimated delivered sugar weight per unit area during the first time period.

2. The sugarcane harvester set forth in claim 1, wherein the sensor suite is configured for sensing data from at least one of the basecutter, the chopper, the extractor or the elevator related to one of a ground speed of the frame, a fan speed of the extractor, a sugar loss through the extractor, or a fuel consumption of the sugarcane harvester.

3. The sugarcane harvester set forth in claim 2, wherein the inputs into the equation include at least one of the ground speed of the frame, the fan speed of the extractor, the sugar loss through the extractor, or the fuel consumption of the sugarcane harvester.

4. The sugarcane harvester set forth in claim 3, wherein the inputs into the equation include all of the ground speed of the frame, the fan speed of the extractor, the sugar loss through the extractor, and the fuel consumption of the sugarcane harvester.

5. The sugarcane harvester set forth in claim 1, wherein the equation is one of a linear equation or a non-linear equation.

6. The sugarcane harvester set forth in claim 1, wherein the processor is operable to execute the sugar prediction algorithm to determine a harvest area during the first time period.

7. The sugarcane harvester set forth in claim 1, wherein the processor is operable to execute the sugar prediction algorithm to calculate an estimated total delivered sugar weight during the first time period based on the estimated delivered sugar weight per unit area during the first time period and the harvest area during the first time period.

8. The sugarcane harvester set forth in claim 6, further comprising a location sensor supported by the frame and configured for sensing data related to a geographic location of the frame.

9. The sugarcane harvester set forth in claim 8, wherein the processor is operable to execute the sugar prediction algorithm to receive data from the location sensor related to the geographic location of the frame at the first time during the first time period of the harvest operation.

10. The sugarcane harvester set forth in claim 8, wherein the processor is operable to execute the sugar prediction algorithm to determine a location of the harvest area during the first time period from the data received from the location sensor.

11. The sugarcane harvester set forth in claim 10, wherein the processor is operable to execute the sugar prediction algorithm to generate a map relating the delivered sugar weight per unit area at the first time during the first time period and the location of the harvest area during the first time period.

12. The sugarcane harvester set forth in claim 1, wherein the first time period is between the range of one tenth of a second (0.1 sec) and ten seconds (10 sec).

13. The sugarcane harvester set forth in claim 1, wherein the processor is operable to execute the sugar prediction algorithm to control an operating parameter of one of the traction element, the basecutter, the chopper, the extractor or the elevator based on the estimated delivered sugar weight per unit area.

14. The sugarcane harvester set forth in claim 13, wherein the processor is operable to execute the sugar prediction algorithm to control the operating parameter by one of:

controlling the traction element to adjust a ground speed of the frame;

controlling the extractor to adjust a fan speed of the extractor;

controlling a deflector to adjust a trajectory of the billets discharged from the chopper; and controlling a topper of the sugarcane harvester to adjust a cut height of the topper relative to the ground surface.

15. A non-transitory computer-readable medium comprising:

an equation configured to receive as inputs into the equation a crop yield, a wagon trash content and a pour rate, and configured to generate as an output an estimated delivered sugar weight per unit area;

instructions that when executed by one or more processors cause the one or more processors to perform operations including:

receiving data from a sensor suite mounted on a sugarcane harvester at a first time during a first time period of a harvest operation;

determining a crop yield at the first time from the data sensed at the first time during the first time period by the sensor suite;

determining a wagon trash content at the first time from the data sensed at the first time during the first time period by the sensor suite;

determining a crop pour rate at the first time from the data sensed at the first time during the first time period by the sensor suite; and estimating a delivered sugar weight per unit area during the first time period using the equation; and controlling an operating parameter of one of a traction element of the sugarcane harvester, a basecutter of the sugarcane harvester, a chopper of the sugarcane harvester, an extractor of the sugarcane harvester or an elevator of the sugarcane harvester, based on the estimated delivered sugar weight per unit area.

16. The non-transitory computer-readable medium set forth in claim 15, wherein the instructions include determining a harvest area during the first time period.

17. The non-transitory computer-readable medium set forth in claim 16, wherein the instructions include generating a map relating the delivered sugar weight per unit area at the first time during the first time period and the harvest area.

18. The non-transitory computer-readable medium set forth in claim 16, wherein the instructions include calculating an estimated total delivered sugar weight during the first time period based on the estimated delivered sugar weight per unit area during the first time period and the harvest area during the first time period.

19. The non-transitory computer-readable medium set forth in claim 16, wherein the equation is configured to receive as inputs into the equation includes at least one of a ground speed of the sugarcane harvester, a fan speed of an extractor of the sugarcane harvester, a sugar loss through the extractor, or a fuel consumption of the sugarcane harvester.

\* \* \* \* \*